(12) United States Patent
Liu (10) Patent No.: US 9,230,326 B1
(45) Date of Patent: Jan. 5, 2016

(54) SYSTEM, METHOD AND CALIBRATION PLATE EMPLOYING EMBEDDED 2D DATA CODES AS SELF-POSITIONING FIDUCIALS

(71) Applicant: Gang Liu, Natick, MA (US)

(72) Inventor: Gang Liu, Natick, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 13/731,308

(22) Filed: Dec. 31, 2012

(51) Int. Cl.
*H04N 17/00* (2006.01)
*H04N 9/093* (2006.01)
*G06T 7/00* (2006.01)

(52) U.S. Cl.
CPC ............................ *G06T 7/0018* (2013.01)

(58) Field of Classification Search
CPC ..... H04N 17/002; H04N 17/00; H04N 9/093; G06T 7/0018; G06T 7/002
USPC .......... 348/188, 187, 181, 180, 182, 135, 722
See application file for complete search history.

(56) References Cited

U.S. PATENT DOCUMENTS

| | | | |
|---|---|---|---|
| 7,163,273 B2 | 1/2007 | Silverbrook | |
| 7,381,503 B2 | 6/2008 | Smith et al. | |
| 8,619,144 B1 * | 12/2013 | Chang et al. | 348/187 |
| 2004/0002642 A1 | 1/2004 | Dekel et al. | |
| 2010/0168763 A1 | 7/2010 | Zhao et al. | |
| 2010/0201809 A1 | 8/2010 | Oyama et al. | |
| 2011/0127331 A1 | 6/2011 | Zhao et al. | |
| 2011/0315770 A1 | 12/2011 | Patel et al. | |

* cited by examiner

*Primary Examiner* — Jefferey Harold
*Assistant Examiner* — Jean W Desir (57) ABSTRACT

This invention provides a system and method for automatic (non-manual) calibration of one or more cameras employs a tessellating calibration plate having a checkerboard tile pattern and a plurality of 2D codes embedded within the checkerboard pattern. Each 2D code encodes the (X,Y) coordinates that identify tile calibration feature locations in the pattern, and the remaining, surrounding tiles allow measurement of the corner positions as calibration features. One or more vision system camera(s) can be calibrated to a single coordinate system automatically. During calibration, an image of at least a portion of a calibration plate is acquired, the encoded data is decoded for at least one 2D code within the field of view of each camera and then the position of the field of view is determined on the calibration plate for each camera using the 2D code data and the checkerboard tile pattern.

19 Claims, 5 Drawing Sheets

SYSTEM, METHOD AND CALIBRATION PLATE EMPLOYING EMBEDDED 2D DATA CODES AS SELF-POSITIONING FIDUCIALS

FIELD OF THE INVENTION

The present invention relates to systems, methods and calibration plates used in machine vision system applications.

BACKGROUND OF THE INVENTION

In machine vision systems (also termed herein "vision systems"), one or more cameras are used to perform vision system process on an object or surface within an imaged scene. These processes can include inspection, decoding of symbology, alignment and a variety of other automated tasks. More particularly, a vision system can be used to inspect a flat work piece passing through an imaged scene. The scene is typically imaged by one or more vision system cameras that can include internal or external vision system processors that operate associated vision system processes to generate results. It is generally desirable to calibrate one or more cameras to enable it/them to perform the vision task(s) with sufficient accuracy and reliability. A calibration plate can be employed to calibrate the cameras.

A calibration plate is often provided as a flat object with distinctive patterns made visible on its surface. The distinctive pattern is generally designed with care and precision, so that the user can easily identify each visible feature in an image of the plate acquired by a camera. Some exemplary patterns include, but are not limited to, dot grids, line grids, or conceivably a honeycomb pattern, a checkerboard of triangles, etc. Characteristics of each visible feature are known from the plate's design, such as the position and/or orientation relative to a reference position and/or coordinate system implicitly defined within the design. Among the features present in the design are calibration features. These are the individual features in a calibration plate's design whose characteristics can be readily measured (for example, the feature's position, size, color, etc.), and whose intended characteristics by the nominal design are known precisely. For example, some possible calibration feature positions include the corners or centers of checkerboard-pattern tiles, or the centers of dots in a dot grid, or the line crossings in a line grid. Although not required, most calibration plate designs include a large number of calibration features arranged in a repetitive pattern. More basically, the primary requirement for a calibration feature is to provide known characteristics that can be readily measured in an acquired image.

Note that the design of a checkerboard pattern provides certain advantages in terms of accuracy and robustness in finding the pattern's calibration features, even in presence of perspective and lens distortions, partial damage to the pattern, and uneven lighting, among other non-ideal conditions.

The design of a calibration plate often includes one or more calibration fiducials. These calibration fiducials are a special subset of the calibration features, and serve as "landmarks" in an otherwise repetitive pattern of calibration features. For example, if a camera has a limited field of view that images only a portion of a checkerboard pattern, it will have no sense of which portion of the pattern is being viewed. In many such instances, a motion stage is used to move the plate (for example by half a tile), and the camera then acquires another image of the calibration plate. Because the pattern is repeating, analysis of the two images (before and after the move) could not determine whether the stage had moved the 0.5 tiles, or 1.5 tiles, or 2.5 tiles, etc. To address this ambiguity, the distinctly-shaped fiducials are embedded in the design, which can be identified and corresponded in the two images, as long as there is only one such distinct fiducial on the entire plate and that fiducial is visible in both the pre-motion image and the post-motion image. The functions served by calibration fiducials are, in part dependent upon the information they present in the image. This is described further below.

For a rigid body, such as a calibration plate, a motion can be characterized by a pair of poses: a starting pose immediately preceding a motion, and an ending pose immediately following the motion—a "pose" herein being defined as a set of numerical values to describe the state of a body, at any one particular instant in time, in some underlying coordinate system—a virtual characterization of the body. For example, in two dimensions (2D), a rigid body can be characterized by three numbers: a translation in X, a translation in Y, and a rotation R. A pose in the context of a calibration plate describes how the calibration plate is presented to the camera(s), when there is relative motion between the camera(s) and the calibration plate. Typically, in a standard so-called "hand-eye calibration", a calibration plate is presented at a number of different poses to the camera(s), and each camera acquires an image of the calibration plate at each such pose. For machine vision hand-eye calibration, the calibration plate is moved to a plurality of predetermined poses at which cameras acquire respective images of the plate. The goal of such hand-eye calibration is to determine the rigid body poses of the camera(s) and calibration plate in the "motion coordinate system". The motion coordinate system can be defined in a variety of ways. The numbers in the poses (that specify where the calibration plate and/or cameras reside in the space) must be interpreted in an appropriate coordinate system. Once a single unified coordinate system is selected, the poses and motion are described/interpreted in that global coordinate system. This selected coordinate system is often termed the "motion coordinate system." Typically "motion" is provided by a physical device that can render physical motion, such as a robot arm, or a motion stage, such as a gantry. Note that either the plate can move relative to one or more stationary camera(s) or the camera(s) can move relative to a stationary plate. The controller of such a motion-rendering device employs numerical values (i.e. poses) to command the devices to render any desired motion, and those values are interpreted in a native coordinate system for that device. Note, although any motion coordinate system can be selected to provide a common, global coordinate system relative to the motion-rendering device and camera(s), it is often desirable to select the motion-rendering device's native coordinate system as the overall motion coordinate system.

Hand-eye-calibration, thus, calibrates the system to a single motion coordinate system by rendering of motions (either moving the calibration plate or moving the cameras), and acquiring images before and after that motion to determine the effects of such motion on a moving object. By way of further background, this differs from standard "non-hand-eye" calibration in which a machine vision application is generally free of any motion rendering device. In such instances, the camera(s) are typically all calibrated relative to the coordinate system of the calibration plate itself, using one acquired image of the plate, which is in a particular position within the field of view of all cameras. The machine vision calibration software deduces the relative position of each camera from the image of the plate acquired by each camera. This calibration is said to "calibrate cameras to the plate", whereas a hand-eye calibration is said to "calibrate cameras to the motion coordinate system."

When the machine vision system employs hand-eye calibration, its software solves poses by correlating the observed motion effect in the images with the commanded motion (for which the commanded motion data is known). Another result of the calibration is a mapping between each pixel position in a camera's image and a physical position in the motion coordinate system, so that after finding a position in the image space, the position in the motion coordinate system can be translated and the motion-rendering device can be commanded to act upon it.

In hand-eye calibration, a conventional calibration plate has several disadvantages. Generally, there are at least three disadvantages to a conventional calibration plate, such as a calibration plate employing a traditional checkerboard pattern with repeated (e.g. tessellated) identical-appearance calibration fiducials, each serving as a local origin in the coordinate system of the calibration plate. In general, the identical nature of pattern elements prevents the plate's calibration fiducials from carrying discrete information about their position in the global coordinate system. Moreover, external inputs are typically required to be manually entered by a user or operator of the system to specify the relative positions of the calibration fiducials/local origins. The size of the field of view of a particular camera imposes a limiting maximum motion range in order for a calibration fiducial (on the calibration plate) to remain within the field of view. Also, significant caution and care should be taken to avoid confusion with nearby fiducials on the calibration plate.

Various attempts have been made to address the disadvantages associated with conventional calibration plates. One attempt is to employ a plurality of 2D DataMatrix codes arranged side-by-side, and to use individual cells inside 2D DataMatrix codes as calibration features. Each individual cell can either be a round dot, or a square/rectangle. However, the circular dots are known to have lower calibration accuracy when there are perspective and radial distortions. Additionally, there are at least two disadvantages associated with the square cells. First, the cells must be large enough (in number of pixels) to achieve the desired accuracy, which causes the entire code to be too large for positioning purposes. Second, as compared with a regular checkerboard, there are many corners in a 2D DataMatrix code that are not visible. The complexity of feature extraction is increased, and the number of usable features is decreased, thereby decreasing the overall efficiency.

Identification markers have also been employed at the center of each checkerboard-pattern tile in an attempt to automate the calibration of multiple cameras. However, this requires using larger checkerboard-pattern tiles, which undesirably reduces the checkerboard-pattern tile density. A 2D DataMatrix code embedded directly within individual checkerboard-pattern tiles does not completely encode the 2D position with sufficient resolution.

Accordingly, it is desirable to provide a calibration plate having self-positioning fiducials embedded thereon. This calibration plate should enable calibration of one or more vision system camera(s), both for hand-eye calibration that involves relative motion between the camera's(s') field(s) of view and the object, and standard non-hand-eye calibration that doe not involve (is free of) such relative motion. It is further desirable for systems containing multiple machine vision cameras to be calibrated to a single coordinate system automatically.

SUMMARY OF THE INVENTION

The disadvantages of the prior art are overcome by providing a system and method for calibrating one or more vision system camera(s). A calibration plate is provided, which includes at least one, and illustratively a plurality of, calibration fiducials in the form of two-dimensional (2D) codes embedded within, for example, code-containing regions (herein also termed "code-containing tiles") of a calibration pattern (illustratively a checkerboard pattern), with each 2D code replacing a predetermined number of (alternating, a tessellated light and dark checkerboard) calibration-pattern tiles. The 2D codes in an illustrative embodiment are based upon the ECC200 DataMatrix, but other 2D code types, such as QR can be used in alternate embodiments. The arrangement of 2D codes, and associated checkerboard-pattern tile pattern, allow for automatic (i.e. non-manual) calibration of the camera(s) in the vision system regardless of the specific orientation(s) of the camera(s) with respect to the scene. The illustrative 2D DataMatrix codes are arranged at a moderate density such that a good balance of image resolution requirements, feature coverage requirements, and a requirement to have at least one code in the camera field of view, can all be achieved. Each 2D code encodes the (X, Y) coordinate of its center position (or any specified reference point, such as a chosen corner) in millimeters (mm), centimeters, inches, or another predetermined measurement unit. Alternatively, the 2D code can be made to encode the measurement unit (e.g. millimeters, meters, mils, inches, etc.) explicitly, in addition to the numerical values. The 2D codes are used as calibration fiducials for identification purposes in hand-eye calibration, and some or all of the remaining checkerboard-pattern tiles provide calibration features, according to an illustrative embodiment. Depending upon the particular application, the 2D code size and density can be adjusted to balance among the requirements of image resolution, feature coverage, and that at least one code always resides in the field of view. In the illustrative embodiment, the code-containing region or "tile" occupies the space of four regular contrasting, light and dark checkerboard-pattern tiles. In alternate embodiments, the code-containing tile can be larger or smaller, occupying more or fewer regular tiles, respectively.

In general, each 2D code, acting as a calibration fiducial in hand-eye calibration, serves three primary purposes: (1) The fiducial allows the vision system to keep track of the same physical point before and after a motion. For this tracking purpose, the fiducial must be uniquely identifiable, but does not have to contain numerical information. 2) The fiducial allows larger motion in which the same fiducial cannot be seen within the camera field of view both before the motion and after the motion. That is, at least one distinct calibration fiducial can be imaged by the camera before the motion, and at least one other distinct fiducial can be imaged by the camera after the motion. More generally, the system determines the geometric relationship between the two (or more) calibration fiducials (e.g. the number of checkerboard-pattern tiles between these two fiducials), from the checkerboard design. To serve this purpose, each calibration fiducial encodes numerical information (and hence can also support purpose (1) above), and the encoded numerical information must be unique/distinct for each individual fiducial. The illustrative 2D DataMatrix codes satisfy this purpose. (3) The numerical (and other) information encoded in the 2D codes is used by the camera/vision system to determine absolute position on the calibration plate. For multiple cameras viewing non-overlapping regions of the same calibration plate, each can use the numerical information in one or more codes acquired by that camera to determine which part of the calibration plate each camera is imaging.

In an illustrative embodiment, the checkerboard pattern comprises tiles having a width of 0.5 mm and a height of 0.5 mm. These dimensions are highly variable in alternate embodiments. The decoder for decoding the 2D code can be embedded within the vision system camera, or provided separately in a different hardware and/or software environment to provide the desired decoding of the data.

In accordance with the illustrative embodiment, a procedure for calibrating one or more vision system camera(s) commences by acquiring an image of at least a portion of a calibration plate when the calibration plate is stationary in the field of view. The image(s) are acquired by the camera(s) either where no relative motion of the plate with respect to the camera(s) occurs (i.e. standard non-hand-eye calibration) or at (at least) two times, one before motion and one after motion, when relative motion exists between the calibration plate and the camera(s) (i.e. hand-eye calibration). The calibration plate includes a plurality of 2D codes arranged on a checkerboard pattern. In embodiments where a plurality of cameras (at least a first camera and a second camera) are used to image the scene, the system decodes at least one visible 2D code (and potentially more than one 2D codes, or all 2D codes) within the field of view of the first camera. The system also decodes at least one 2D code (and potentially more than one 2D codes, or all 2D codes) within the field of view of the second camera. The field of view position for each camera with respect to the calibration plate is determined by finding/measuring corner positions, which serve as calibration features, on the remaining tiles surrounding 2D codes, while the codes serve to identify locations of tiles and associated corners in the global calibration plate coordinate system.

In an embodiment, a calibration plate for calibrating at least one camera includes a checkerboard pattern defining a plurality of tiles. The checkerboard-pattern tiles provide calibration features, such as lattice crossings/corners used for measurement of an associated coordinate system. A plurality of 2D codes are embedded within code-containing tiles of the checkerboard pattern. Each of the plurality of 2D codes is encoded with a respective reference position with respect to one or more anchor calibration features. The 2D codes are illustratively arranged at a density on the checkerboard pattern that provides at least one of the 2D codes within a field of view of the camera at a predetermined runtime viewing distance therefrom. The 2D codes can comprise DataMatrix-type codes. Illustratively, the calibration plate is adapted for use on a motion stage (or in association with another motion-rendering device) in which the camera(s) each acquire a plurality of images at predetermined intervals, between each of which intervals, motion occurs. The cameras/vision system hardware/software components then employ the plurality of images to establish a respective coordinate system for the camera(s). Where multiple cameras are employed, the respective coordinate system for each of the cameras is then used to calibrate the overall system of cameras into a single global coordinate system (e.g. a motion coordinate system) by appropriate techniques.

BRIEF DESCRIPTION OF THE DRAWINGS

The invention description below refers to the accompanying drawings, of which.

DETAILED DESCRIPTION

In overview, a system for calibrating one or more cameras in a machine vision system (termed briefly "vision system") includes a calibration plate having a plurality of two-dimensional (2D) codes arranged thereon for automatic (i.e. non-manual) calibration of the camera(s) in the vision system. In an illustrative embodiment, the calibration (either hand-eye calibration or standard non-hand-eye calibration) is performed to align flat work pieces to a piece of process equipment, such as in screen printing cover lenses of cell phones, computing tablets (such as Apple iPads®) and flat-panel displays, for example. The 2D codes (in this example consisting of DataMatrix-type codes) are arranged at a moderate density such that a good balance of image resolution requirements, feature coverage requirements, and requirement that at least one code always remain visible (capable of being fully imaged/decodable) in the camera field of view, is achieved. In an illustrative embodiment, each 2D code encodes the (X, Y) coordinate of its reference position in (for example) millimeters. Accordingly, each 2D code has a unique identifier (its position) and cannot be confused (are free of confusion) with respect to other adjacent or proximate 2D codes. The 2D codes are calibration fiducials that are used for identification purposes and the rest of the checkerboard-pattern tiles are for measurement of the corner positions, according to an illustrative embodiment. Depending upon the particular application, the 2D code size and density can be adjusted to balance among the requirements of image resolution, feature coverage and at least one code being in the field of view.

In an illustrative embodiment, 2D DataMatrix codes typically include at least two levels of data. The first level of data is its own geometric structure and its own respective coordinate system for identifying each dot within the 2D DataMatrix structure. The second level of data is that all of the dots together encode different information. For example, the 2D code can encode coordinates, or a pair of numbers that include two three-digit numbers, for example to cover the combinations for −999 through +999, using (for example) the millimeter as the unit of length-measurement. Alternatively, length measurement can be expressed as meters, in which case the value range −999 through +999 can correspond to −0.999 through +0.999 meter. For example, to represent a calibration plate that is 1.998 meters by 1.998 meters, in which the center (reference) position would be 0, 0 and −1 meter (to the left of 0, 0 along an X axis) would be indicated as coordinates −999 (−0.999 meter), 0 while +1 meter (to the right of 0, 0 along the X axis) would be indicated as coordinates +999 (+0.999 meter), 0. Likewise, according to this example, the uppermost point along the Y axis (+0.999 meter) in this direction would have coordinate values of 0, +999 and the bottommost point along the Y axis (of the 2D code) would have a coordinate value of 0, −999. According to another example, to provide a value of nine (9) alphanumeric digits (e.g. 12345ABCD), a 14×14 2D DataMatrix code is implemented. In a further embodiment, a larger code can be employed, and the physical size (e.g. x-y dimensions) of the checkerboard-pattern tiles can also be encoded within the 2D DataMatrix, in addition to other data described herein (e.g. the measurement unit(s)).

Figure 1:
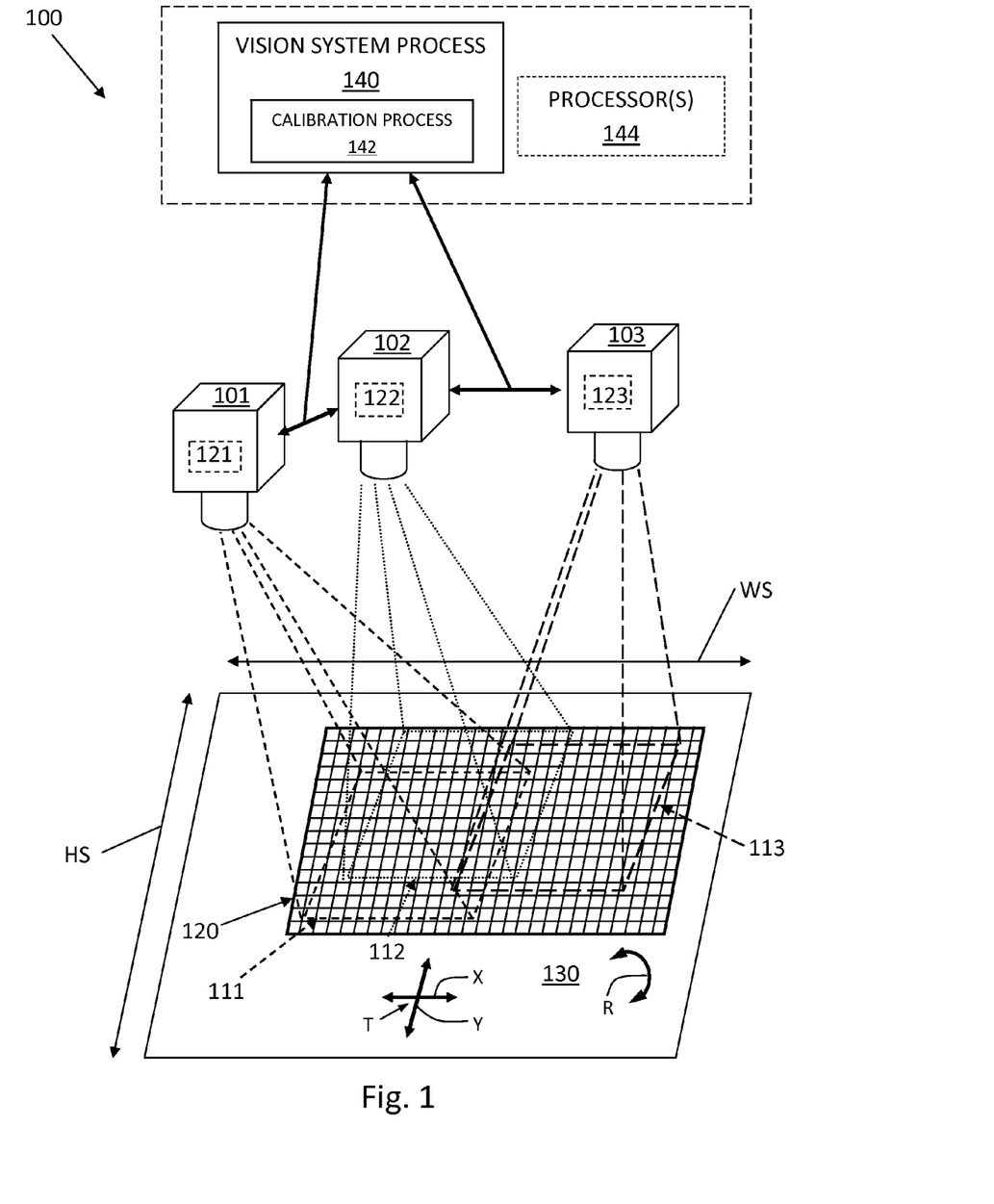
FIG. 1 is a schematic diagram of an overall system for calibrating one or more vision system cameras, in accordance with an illustrative embodiment employing a calibration plate having embedded 2D codes on a checkerboard pattern as self-positioning fiducials to calibrate the camera(s) to a coordinate system within an imaged scene.

Reference is now made to FIG. 1 showing a schematic diagram of an overall system 100 for calibrating one or more vision system camera(s) (also briefly termed "camera(s)), in accordance with an illustrative embodiment. While three cameras 101, 102 and 103 are depicted, the system can employ a fewer or greater number, all generally directed toward a scene, with or without (free of) overlap between respective camera fields of view. In an embodiment, a single camera (for example camera 101) can be used to image the scene, and while the calibration plate and processes of the illustrative embodiment, as described below, are directed to a plurality of arranged cameras, it is expressly contemplated that (unless otherwise indicated) such plate and processes can be directed to calibration of a single camera.

The system 100 employs an illustrative calibration plate 120 having 2D codes (not shown in FIG. 1 for simplicity—see FIG. 3) arranged on a checkerboard pattern as self-positioning calibration fiducials in place of at least some of the checkerboard-pattern tiles to calibrate the plurality of cameras to a common global (motion) coordinate system. Note that while a pattern consisting of a checkerboard grid of tessellated light and dark squares is used as the design in the illustrative plate, a variety of alternate patterns and associated calibration features, as described above, can be employed in alternate embodiments. The exemplary cameras 101, 102, 103 are employed to image the scene, with each camera defining a respective field of view 111, 112, 113 that generally includes therein the calibration plate 120. Each camera 101, 102, 103 respectively includes an image sensor 121, 122, 123 (also termed an "imager" or briefly, "sensor") for acquiring image pixel data within the field of view 111, 112, 113 of each camera. In various embodiments, in which hand-eye calibration processes are employed, the calibration plate 120 is moved along a surface 130 by an appropriate motion-rendering device (e.g. a gantry, robot arm, etc.) in translational motion (T) along the (x and/or y axes) and/or rotational motion (R) so as to calibrate the cameras 101, 102, 103 to a common motion coordinate system. In alternate embodiments, the calibration plate can be stationary with respect to the imaged scene, and the camera(s) can be movable relative to the scene. Also, while motion is described in the illustrative embodiment, it is expressly contemplated that the plate and procedures described herein can be applied to such a stationary arrangement, as in the case of standard non-hand-eye calibration. When motion occurs it can be characterized as translational motion, rotational motion (typically about an axis perpendicular to the plane of the plate/underlying motion stage), or a combination of translation and rotation. Note, while not shown, it is also expressly contemplated various embodiments can also account for three dimensional (3D) motion, including at least one of (a) translation along a z axis that is perpendicular to the plane defined by the x and y axes, and (b) tilt/rotation out of the x-y plane. As noted below, appropriate camera arrangements and applications can provide 3D pose information to the system. Thus, as used herein, and unless constrained to a 2D system, the terms "translation" and "rotation" shall be applicable to 3D motion.

The image data acquired by the sensors 121, 122, 123 is transmitted (via appropriate wireless, hard-wired or other communication channel/link known in the art) to a vision system process 140 that includes a calibration process 142. Processor(s) 144 are also provided to perform the appropriate processes for the vision system and calibration. Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Furthermore, the processor(s) and process(es) depicted in FIG. 1 can be distributed amongst the cameras, implemented in a single camera, or implemented as a separate standalone processor as shown in FIG. 1.

Again, while the depiction of FIG. 1 and illustrative procedure described herein are based upon a plurality (at least two, and three or more as shown) of cameras imaging a scene that includes a motion-rendering device (translational, rotational, or both), it is expressly contemplated that a single camera can be employed (or only one camera of a plurality of cameras is calibrated at a time) and/or the calibration plate and camera(s) can be in relative motion or stationary with respect to each other.

Figure 3:
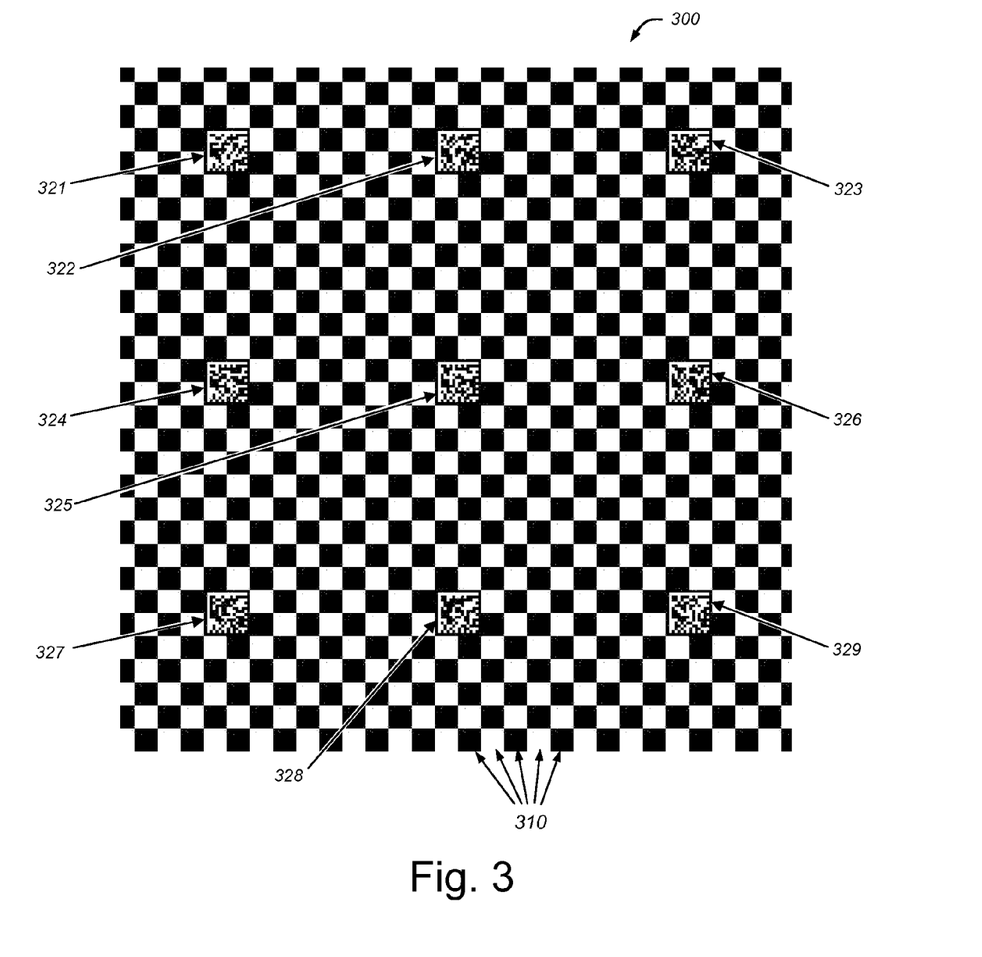
FIG. 3 is a schematic diagram of an exemplary calibration plate pattern that includes a plurality of embedded 2D codes in accordance with the illustrative embodiment.

In an illustrative embodiment, the calibration plate 120, which is described in greater detail, for example, with reference to FIG. 3, has a width of approximately 1 m and a height of approximately 1 m, although the exact size and shape of the calibration plate 120 is highly variable within ordinary skill, from several millimeters in width and height to several meters, depending upon the particular application and size of the object or surface being analyzed in runtime operation of the system. Refer, for example, to FIG. 3 showing an exemplary diagram of a portion calibration plate with a checkerboard-pattern design in accordance with the illustrative embodiments. Illustratively, the surface 130 defines a width WS of approximately 0.5 meters and a height HS of approximately 0.5 meters (square), however the width and height of the surface 130 upon which the calibration plate 120 is passed is highly variable within ordinary skill depending upon the particular application and environment of the vision system and can range from less than 1 millimeter up to any length practical for moving a calibration plate along the surface in calibrating the cameras.

Often, a vision system camera 101, 102, 103 includes an internal processor and other components that allow it to act as a standalone unit, providing a desired output data (e.g. feature information and decoded symbol information) to a downstream process, such as an inventory tracking computer system. The processor can be entirely self-contained within the camera body, partially contained within the body, or external to the body as shown at 144—such as a standalone computer (e.g. a PC) or other remote computing device. Appropriate wired and/or wireless communication links are provided between the sensor 121, 122, 123 and the processor(s) 144 and other downstream image-data-processing and/or image-data-handling components. The processor 144 can also control other typical functions such as internal or external illumination (not shown), triggering, etc.

Figure 2:
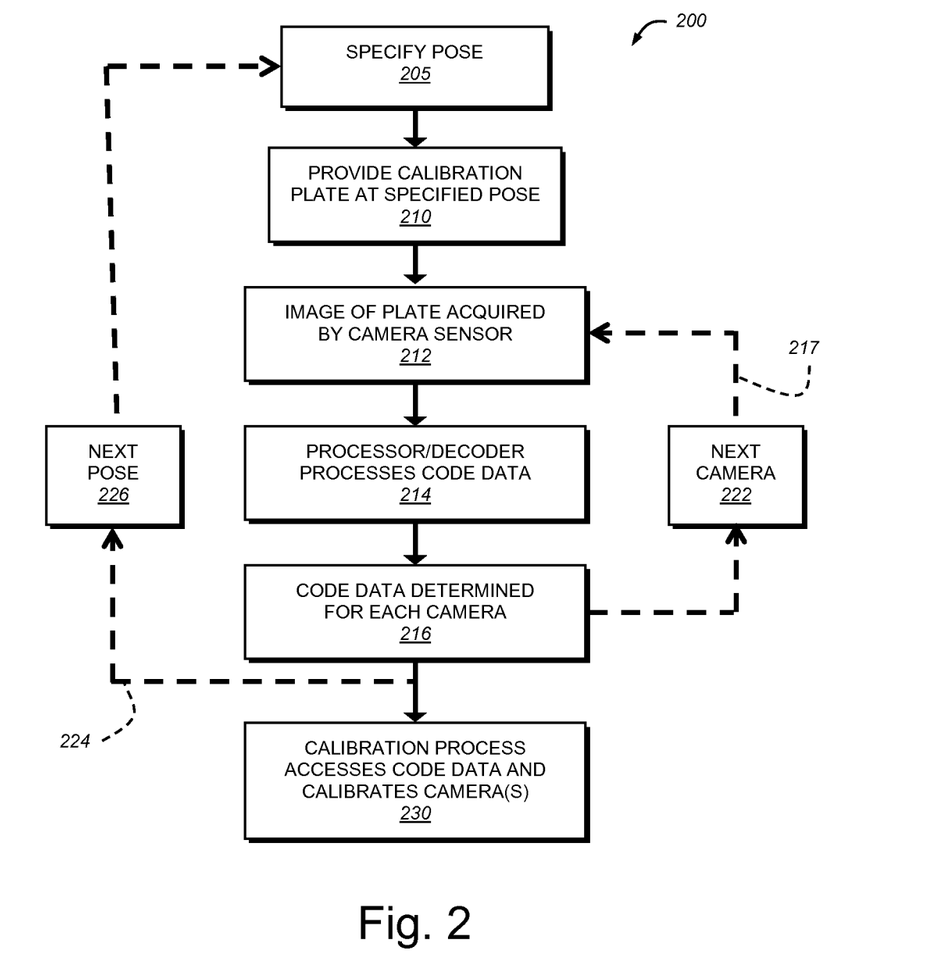
FIG. 2 is a flow diagram of the overall procedure for automatically performing calibration of one or more cameras in a vision system in an example in which the system images an object when there is relative motion with respect to the camera(s), in accordance with the illustrative embodiment.

Referring now to FIG. 2, a flow diagram of the overall procedure 200 for performing automatic (non-manual) calibration of one or more cameras in a vision system imaging a scene containing a surface or object (such as a calibration plate). Both hand-eye and standard non-hand-eye calibration processes are illustrated. At step 205, a position and orientation (pose) is specified for a motion-rendering device to render. This step is illustratively implemented when the object/calibration plate moves through the scene on a conveyor, or other motion-rendering device, and the camera acquires (or a plurality of cameras each acquire) respective images of the calibration plate at each of a plurality of poses that are each rendered by the motion-rendering device. At step 210, a calibration plate is thus located at a given position and orientation (pose) specified in the underlying global coordinate system (e.g. the coordinate system of the motion-rendering device that carries around the calibration plate—the "motion coordinate system"). The tile and code data on the calibration plate is then acquired by the camera sensor at step 212. The calibration plate in accordance with the illustrative embodiments herein includes a plurality of embedded 2D codes that serve as self-positioning fiducials, as described in greater detail herein, particularly with reference to FIGS. 3-5. By way of example, the 2D codes used are the standard ECC200 DataMatrix 2D format, but the term "2D code" can be taken broadly to include a variety of other code types (for example QR codes).

With further reference to FIG. 2, at step 214, the processor or decoder processes the code data. Where multiple cameras are employed, the code data is determined for each camera at step 216 and the system continues via loop 217 to repeat steps 212, 214 and 216 until the code data is determined for each camera (block 222) in the vision system. This loop 217 is shown as a dashed branch as it is implemented in arrangements with multiple (a plurality of) cameras. Also optionally, steps 205, 210, 212, 214 and 216 are repeated at predetermined intervals when there is relative motion between the camera(s) and the surface and/or calibration plate. Such intervals can be established based upon an external trigger signal that indicates when the motion-rendering device has completed the intended motion and placed the calibration plate in the specified pose—this can be generated based, for example on encoder pulses associated with a device drive motor. The procedure loop 224 repeats for each (next) specified pose (block 226) after motion is complete. Note, in other embodiments involving standard non-hand-eye calibration, the calibration plate can remain stationary, and one or more images are acquired of it in such stationary position to perform calibration, in which case loop 224 is omitted, or an image of the plate in the same pose is repetitively acquired and processed in each iteration of the loop 224. Note that the ordering of steps in the procedure 200 can be widely varied. For example, all image frames can be acquired and stored in each camera and then the processing steps (e.g. 214, 216 and 230) occur. Likewise, some processing steps can occur within each camera simultaneously for each pose, and then calibration steps (i.e. step 230 below) can occur with data combined from each individual camera's processor/storage.

Once the images of the plate in all poses, and relative to all cameras, have been processed, at step 230, the calibration process 200 then accesses the code data and calibrates the cameras based upon the code data and checkerboard-pattern tile positions that are found by the camera sensor and processed by the processor. The processor can be implemented within or as part of each camera, as part of a single one of the cameras, or as a standalone processor for performing the processing functions shown and described herein.

Conventional prior art calibration plates require manual calibration because they lack the information which allows the cameras to automatically determine their position relative to the calibration plate. Accordingly, as shown in the diagram of the calibration plate 300 of FIG. 3, the calibration plate 300 includes a plurality of checkerboard-pattern tiles 310 and additionally includes a plurality of exemplary 2D DataMatrix codes 321, 322, 323, 324, 325, 326, 327, 328, 329 arranged on the checkerboard pattern. The number of codes shown in FIG. 3 are an exemplary illustration of the number (density) of 2D DataMatrix codes that can be provided on an exemplary checkerboard pattern as calibration fiducials. The number and placement of 2D codes within the checkerboard pattern is highly variable within ordinary skill to achieve a good balance of image resolution requirements, feature coverage requirements and requirement to have at least one code in the camera field of view can all be achieved. In an illustrative embodiment, each 2D code encodes the (X, Y) coordinate of its reference position in millimeters. The 2D codes are used for identification purposes and the rest of the checkerboard-pattern tiles are for measurement of the corner positions, according to an illustrative embodiment. Depending upon the particular application, the 2D code size and density can be adjusted to balance among the requirements of image resolution, feature coverage and at least one code being in the field of view. The 2D codes serve as anchor points by providing their checkerboard grid location on the calibration plate, thereby allowing the location by the camera of associated calibration features (e.g. the corners) relative to the calibration plate to be determined automatically. For example, the exemplary 2D DataMatrix code 321 is encoded with the (X, Y) coordinates of its reference position. The checkerboard-pattern tiles are used for measurement of corner positions of each checked tile, such that the checkerboard corners adjacent to the 2D code have eight values, consisting of (0, 1), (1, 1), (1, 0), (1, −1), (0, −1), (−1, −1), (−1, 0) and (−1, 1), for example. The X, Y position of each corner with respect to the 2D DataMatrix code is readily identifiable from the 2D code data and the X, Y coordinates.

The design of the calibration plate of FIG. 3, by way of example, defines a tessellating checkerboard pattern of approximately 30 tiles wide×30 tiles high with 29×30 internal corners. This results in 870 corners according to a standard checkerboard pattern, which are used as calibration features in this embodiment. Each 2D code eliminates nine (9) corners. In an illustrative embodiment, the use of nine (9) 2D codes within the plate pattern eliminates 81 corners/calibration features. Thus approximately 9.3 percent of the possible calibration features in the checkerboard pattern are eliminated, a relatively low percentage to conversely gain the capability of automatic calibration without (free of) tedious and error-prone manual input of data. Illustratively the 2D DataMatrix codes are spaced (distributed) evenly on the calibration plate, which ensures that at least one 2D DataMatrix code is visible within the field of view (FOV) of the camera(s) during calibration. More particularly, the illustrative 2D code density (number of codes versus number of tiles) on the plate allows for the use of a relatively small camera FOV, generally consisting of 11×11 tiles, which thereby ensures that at least one code will appear in the FOV. If the camera FOV is larger, then the density of 2D codes on the plate can be reduced, lowering the percentage of eliminated calibration features.

Figure 4:
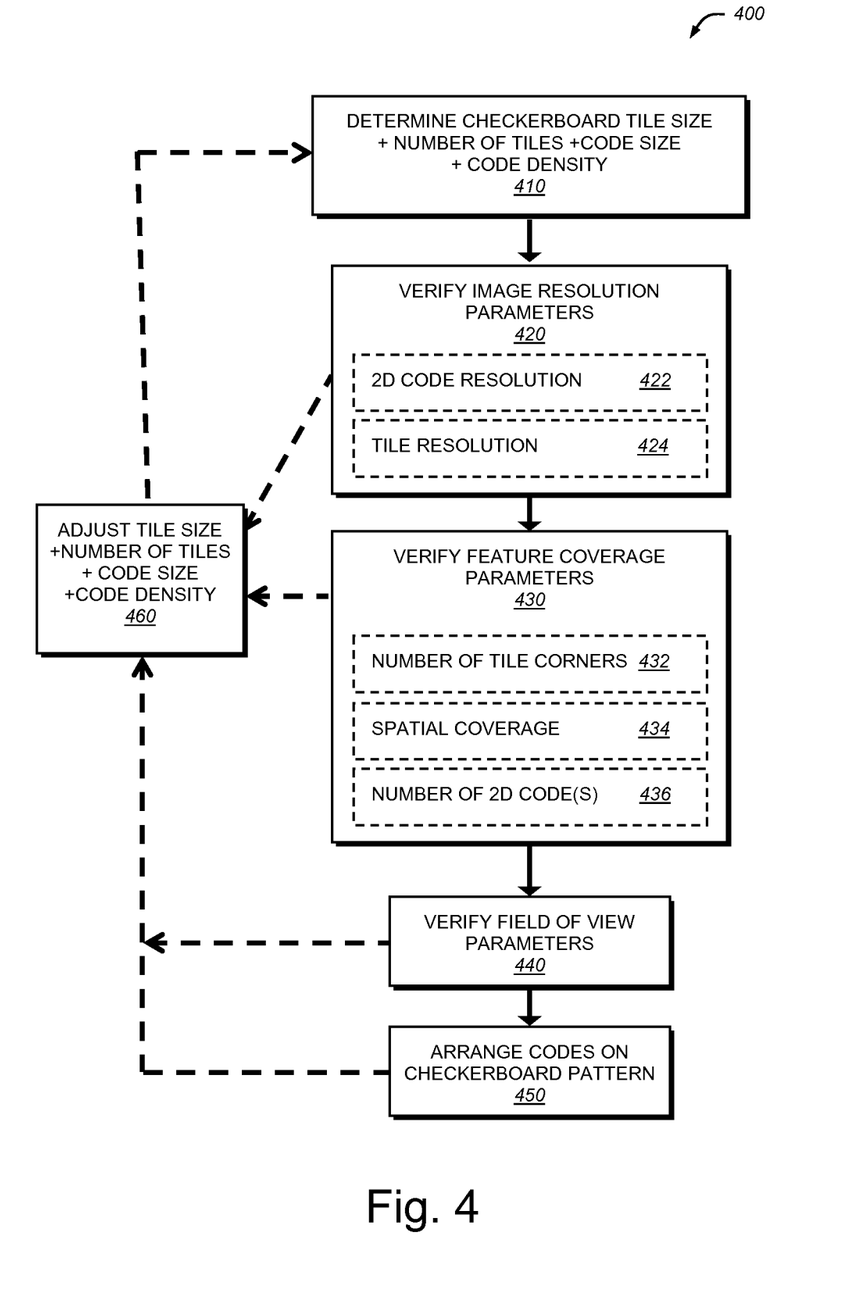
FIG. 4 is a flow diagram of the procedure for determining the arrangement of 2D codes and associated checkerboard pattern tiles on the calibration plate of FIG. 3, in accordance with the illustrative embodiment.

With reference to FIG. 4, a flow diagram of a procedure 400 for determining the arrangement of 2D DataMatrix codes and associated checkerboard-pattern tiles on the calibration plate is shown, in accordance with an illustrative embodiment. The procedure 400 commences at step 410 by determining a checkerboard-pattern tile size and the number of tiles. For the selected tile size, number of tiles, code size and number of codes, the image resolution parameters are verified at step

420. The image resolution parameters include the 2D code resolution 422, which can be derived based upon how decodable a particular imaged 2D code is to a user. The image resolution parameters also include the tile resolution 424. During calibration, it is desirable to have enough tile pixel resolution to accurately measure the corner positions as calibration features, to thereby ascertain the accurate location of the camera relative to the checkerboard tile pattern. If the codes are decodable, and the identified tiles/tile corner positions are found with satisfactory accuracy, and the image resolution parameters are thus satisfactory, then the procedure continues to verify the feature coverage parameters at step 430. The feature coverage parameters include the number of checkerboard-pattern tile corners 432, the spatial coverage 434 and the number of acquired 2D code(s) 436. It is desirable to have the maximum number of checkerboard-pattern tile corners, as well as a large spatial coverage of the tiles and a moderately dense arrangement of 2D codes. Finally, at step 440, the procedure verifies the field of view requirements to ensure that at least one code is in the field of view for each camera at any desired camera placement with respect to the surface/stage upon which the calibration plate is located (and/or moves) during the calibration procedure. Once all of the parameters have been verified, the codes are arranged on a checkerboard pattern at step 450. If at any time the parameters are not satisfied, including the image resolution parameters 420, the feature coverage parameters 430 and the field of view parameters 440, then the procedure 400 advances to step 460 in which the tile size, number of tiles, code size and code density is adjusted and the procedure 400 is reiterated until the desired number and placement of 2D codes is achieved.

Determining the number and positioning of 2D codes is highly variable and should be readily apparent to those having ordinary skill, to achieve the desired calibration procedures and functions for a particular vision system application. In general, once a calibration plate is created for a particular application, this calibration plate can be used an indefinite number of times to calibrate the cameras, given that the cameras can automatically ascertain their position relative to the calibration plate through analysis and processing of the code data viewable within the field of view for a particular camera.

Figure 5:
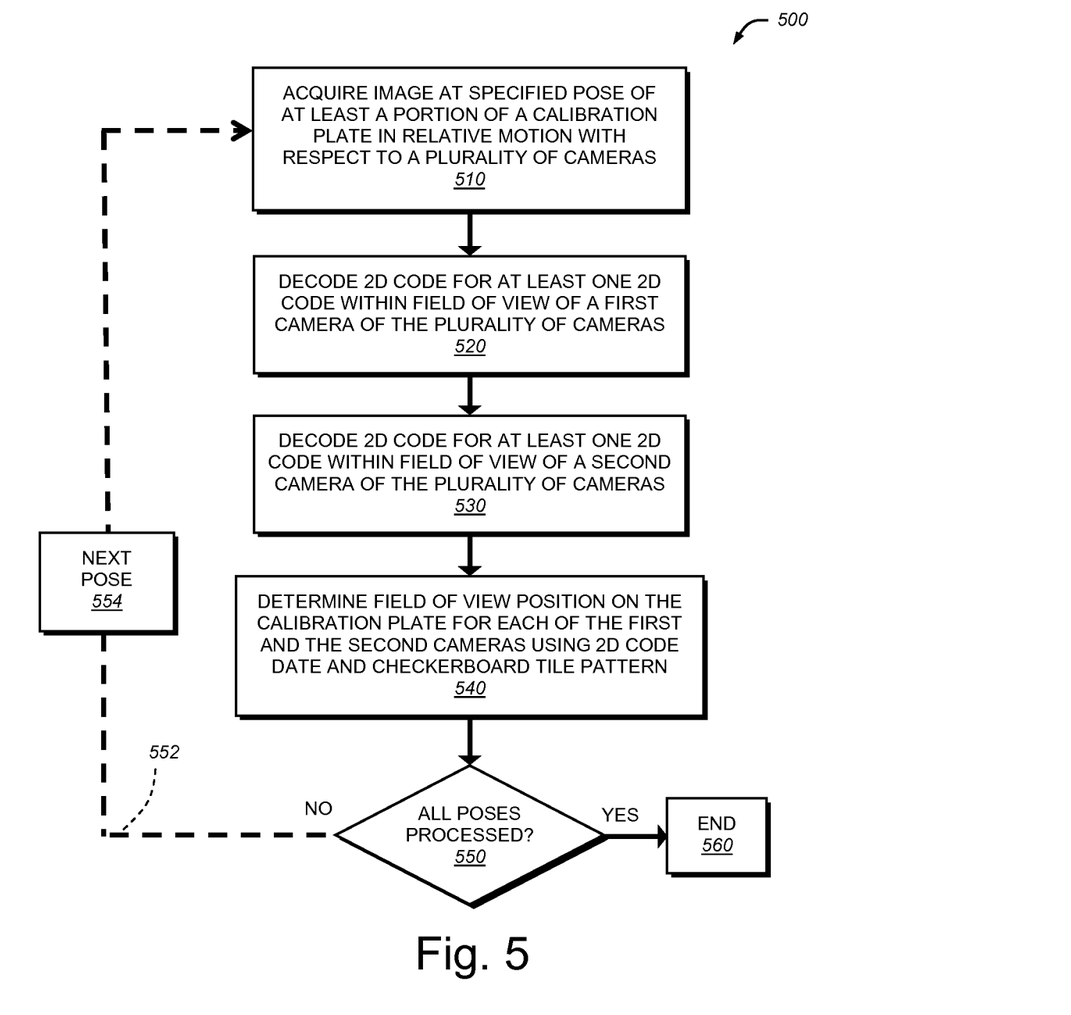
FIG. 5 is a flow diagram of the procedure for performing runtime calibration of a plurality of cameras with respect to a common motion stage coordinate system, in accordance with an illustrative embodiment.

Reference is now made to FIG. 5 showing a flow diagram of a procedure 500 for calibrating one or more cameras to a common (global) coordinate system. The procedure 500 can be applied to either a stationary object/calibration plate in a standard non-hand-eye calibration process, or a system/process employing hand-eye calibration, in which relative motion between the camera(s) and object/calibration plate is provided in accordance with the illustrative embodiments. At step 510, images of at least a portion of a calibration plate are acquired, wherein there is relative motion between the calibration plate and the plurality of cameras, and such relative motion is described by the specified poses. For each specified pose, the encoded data for at least one 2D code (and potentially a plurality of 2D codes or all 2D codes) within the field of view for a first camera is then decoded at step 520 to determine the location of the calibration plate with respect to the first camera. At step 530, the encoded data for at least one 2D code (and potentially a plurality of 2D codes or all 2D codes) within the field of view for a second camera is decoded to determine the location of the calibration plate with respect to the second camera. The step of decoding code data can be reiterated until data from 2D codes within the field of view for each camera in the system has been decoded. Finally, at step 540, the procedure determined the position of the field of view on the calibration plate for both the first and the second cameras using the 2D code data and the checkerboard tile pattern. Decision step 550 determines whether all specified poses have been processed. Where images are acquired at multiple specified poses before and after relative motion (or another factor) between the plate and camera(s), and poses remain to be processed, the procedure 500 branches (via optional branch 552 and step 554) back to initial procedure step 510. When images relative to all specified poses have been processed, the decision step 550 ends the procedure 500 (step 560). Accordingly, the position of each camera with respect to the calibration plate is automatically determined based upon information accessed by the sensors of the cameras. The camera(s) can thus be calibrated to a global coordinate system though automatic (non-manual) processes through use of the information accessed by the camera sensors.

By way of further summary, it should be clear that the 2D codes effectively identify (that is, giving a "name" or establishing a label for) calibration features. In the case of the illustrative, regular checkerboard pattern (where all tiles have exactly the same size), the corners of the checkerboard-pattern tiles effectively form a lattice grid. The lattice structure itself is rigid, so there is a fixed step in distance and orientation from one lattice crossing to the next crossing. Once the lattice positions are established its crossing points (corners) will remain fixed. Therefore, the physical positions of all crossings are fixed. Due to the rigid structure of the lattice, the system and method allows for the choice of a particular crossing and identifying/naming/labeling it as a coordinate (A, B), where A and B can be integer numbers. The numbers can be further characterized by the directions of a positive/negative X direction and a positive/negative Y along the lattice network. In this manner, all other lattice crossings are implicitly provided with a unique name/label that is consistent with the (A, B) label scheme. In other words, the next crossing along the positive X direction should be (A+1, B), etc. These labels generally serve to identify crossings in the lattice grid, or serve to mark a position on a grid. The labeling can be arbitrary depending on which crossing is selected as a first anchor crossing and the particular label that the system assigned to it. Each crossing also provides a physical position determined by the position of the entire lattice. For a specified pose of the calibration plate, the physical positions of all lattice crossings are uniquely determined, and known. The relative positions among crossings remain unchanged, regardless of the state of the pose due to relative motion.

The illustrative 2D codes are used to identify the lattice crossings. For example, in an embodiment, each 2D code occupies the space of four checkerboard-pattern tiles, and hence, occludes one lattice crossing (at the center of the 2D code). Although occluded, the crossing still exists on the underlying lattice grid of checkerboard-pattern tile corners, and this crossing is effectively marked by the 2D code. That is, the occluded crossing's physical position is implicitly defined by the arrangement of the underlying lattice grid. Illustratively, the position of the identified lattice crossing is independent of the 2D code position, as long as they are within a half tile distance to guarantee correct correspondence. In general, it is desirable that the 2D code, regardless of its particular positioning within the square of the lattice, provides the label for an anchor crossing, so that the labeling of the entire lattice grid can "grow" from that anchor point. This imposes a rule that all 2D codes on the lattice grid are consistent with each other. Based upon this implementation, the entire lattice grid will be defined by the same labeling scheme regardless of which seed (anchor point) is selected for growing the labels. To ensure that the lattice grid is properly grown in the system, each code represents a discrete, non-conflicting value.

Illustratively, the calibration process employs both the position and the label for each lattice crossing (corner). A vision system process can measure the position (of the checkerboard-pattern tile corner) from the acquired image, and another process can automatically assign the label by constructing the portion of the lattice grid visible in the image and labeling the grid from the anchor points (corners) provided by the 2D codes. If the camera images more than one 2D code visible in the image, then the extra code (or codes) provides improved robustness in case some of the codes in the pattern are damaged or otherwise undecodable.

It should be clear that the systems and methods shown and described herein advantageously allow for automatic calibration of one or more cameras within a vision system where the calibration process either requires relative motion between the calibration plate and camera(s), such as in a typical hand-eye calibration, or does not require any such relative motion, such as for standard non-hand-eye (stationary) calibration. The calibration plate contains 2D data codes which identify location of the code itself relative to plate calibration features, such that the cameras can automatically determine their position relative to the calibration plate based upon the data contained in the 2D data code. This desirably allows for automatic, non-manual calibration of the cameras.

In conclusion, a system and method for system for calibrating at least one camera entails providing a first camera with a first camera field of view of a scene containing an object. A calibration plate is provided, which defines a calibration pattern. This pattern provides calibration features and at least a first two-dimensional (2D) code embedded within a first code-containing region of the calibration pattern. The first 2D code is encoded with a numerical coordinate value representing a reference position of at least a first anchor calibration feature defined relative to at least one of the calibration features. A vision system process, operatively connected to the first camera, determines, for the first camera, a first coordinate system based upon physical locations of at least some of the calibration features derived from the first anchor calibration feature and respective imaged locations of the calibration features. In addition, a calibration system process calibrates the first camera to determine a position and an orientation of the first coordinate system of the first camera relative to a common coordinate system. This common coordinate system is based upon either of (a) a predetermined positioning of the calibration plate or (b) characteristics of a motion-rendering device that moves either the calibration plate or the first camera during the calibration system process.

Illustratively, a second camera can also be provided, with second camera field of view of the scene. This second camera field of view images at least one of (a) the first 2D code and (b) a second 2D code that is encoded with a numerical coordinate value representing a reference position of at least a second anchor calibration feature defined relative to at least one of the calibration features. The vision system process is operatively connected to the second camera, to determine, for the second camera, a second coordinate system based upon physical locations of at least some of the calibration features derived from at least one of (a) the first anchor calibration feature and (b) the second anchor calibration feature. The calibration system process calibrates the second camera to determine a position and an orientation of the second coordinate system of the second camera relative to the common coordinate system. In systems and methods employing one or more cameras, the motion rendering device is constructed and arranged to move an object therethrough in at least one of translational and rotational motion and each of the vision system process and the calibration process is constructed and arranged to operate on a plurality of images of the calibration plate acquired at predetermined intervals between motion stages.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, although the vision system shown and described herein employs three cameras, any number of cameras is contemplated to achieve the desired image resolution, feature coverage and field of view parameters for calibration of the cameras. Additionally, the orientation of cameras and sensors with respect to the surface upon which the calibration plate passes is highly variable in alternate embodiments and can be varied based upon, for example vision system concerns. In further embodiments it is also contemplated that visible calibration features (as opposed to invisible features) can be labeled. More generally a calibration feature can be defined as a lattice crossing. Thus in a checkerboard pattern, the calibration feature can be a tile corner (which is desirable for high accuracy) or a tile center (which can be acceptable in lower accuracy applications). Moreover, although the various illustrative embodiments have been shown with respect to a tessellating checkerboard pattern, any similar pattern of geometric shapes, underlying calibration features, and 2D-code-based calibration fiducials can be implemented within ordinary skill. Also, while the checkerboard pattern consists of a plurality of visible, tessellating light and dark tiles (e.g. black and white), a differing combination of contrasting tiles can be employed—for example, IR and non-IR contrasting tiles, differing visible colors or a combination of non-visible and visible wavelengths. More generally, the differing checkerboard pattern tiles (or other structures) of the calibration pattern can be defined as having differing (contrasting) visual appearance with respect to each other. This visual appearance difference can be based on differing transmitted wavelengths/frequency response, or other differences within the same frequency response—for example a reflective versus a matte (frosted, peened, etc.) surface. Any surface characteristics that allow a sensor to differentiate between them can be employed. The 2D code can, likewise be provided as a printed structure, or another visual (imageable) structure—such as a peened or etched pattern, or a non-visible (e.g. IR-transmissive) pattern. Also, as used herein the term "checkerboard pattern", should be taken broadly to any appropriate "calibration pattern", including but not limited to, dot-grids, line grids, tessellating polygons (triangles, hexagons, etc.), and combinations of such arrangements. In addition, while the calibration plate is imaged at each of a plurality of 2D poses, to perform hand-eye calibration, it is expressly contemplated that the calibration plate can be imaged in poses that include a varying third dimension (3D), using appropriate camera arrangements (e.g. stereoscopic cameras, triangulation of multiple cameras, range-sensing cameras, etc.). Accordingly, this description is meant to be taken only by way of example, and not to otherwise limit the scope of this invention.

What is claimed is:

1. A system for calibrating at least one camera, the system comprising:
   a first camera, the first camera having a first camera field of view of a scene containing an object;
   a calibration plate defining a calibration pattern that provides calibration features and at least a first two-dimensional (2D) code embedded within a first code-containing region of the calibration pattern such that the first 2D code replaces a predetermined portion of the calibration pattern, the first 2D code being encoded with a numerical coordinate value representing a reference position of at least a first anchor calibration feature defined relative to at least one of the calibration features;
   a vision system process, operatively connected to the first camera, that determines, for the first camera, a first coordinate system based upon physical locations of at least some of the calibration features derived from the first anchor calibration feature and respective imaged locations of the calibration features; and
   a calibration system process that calibrates the first camera to determine a position and an orientation of the first coordinate system of the first camera relative to a common coordinate system that is based upon either of (a) a predetermined positioning of the calibration plate or (b) characteristics of a motion-rendering device that moves one of either the calibration plate and the first camera during the calibration system process.

2. The system of claim 1 further comprising;
   a second camera, the second camera having second camera field of view of the scene, the second camera field of view imaging at least one of (a) the first 2D code and (b) a second 2D code that is encoded with a numerical coordinate value representing a reference position of at least a second anchor calibration feature defined relative to at least one of the calibration features,
   wherein the vision system process is operatively connected to the second camera, to determine, for the second camera, a second coordinate system based upon physical locations of at least some of the calibration features derived from at least one of (a) the first anchor calibration feature and (b) the second anchor calibration feature, and
   wherein the calibration system process calibrates the second camera to determine a position and an orientation of the second coordinate system of the second camera relative to the common coordinate system.

3. The system of claim 2 wherein each of the first 2D code and the second 2D code comprise a DataMatrix-type code.

4. The system of claim 2 wherein the motion rendering device is constructed and arranged to move an object therethrough in at least one of translational and rotational motion and each of the vision system process and the calibration process is constructed and arranged to operate on a plurality of images of the calibration plate acquired at predetermined intervals between motion stages.

5. The system of claim 2 wherein the first camera field of view overlaps the second camera field of view of the calibration plate.

6. The system of claim 1 wherein the calibration pattern defines a checkerboard pattern of tiles.

7. The system of claim 6 wherein the checkerboard pattern of tiles defines tessellating tiles having contrasting visual appearance with respect to each other.

8. The system as set forth in claim 7 wherein the contrasting visual appearance comprises contrasting visible light and dark colors.

9. The system of claim 7 wherein the 2D code encodes at least one of (a) a size of the tiles, (b) a number of the tiles in the checkerboard pattern, (c) a size of the 2D code, (d) a number of 2D codes on the calibration plate, and (e) a measurement unit with respect to the numerical coordinate value.

10. The system of claim 1 wherein the motion rendering device is constructed and arranged to move an object therethrough in at least one of translational and rotational motion and each of the vision system process and the calibration process is constructed and arranged to operate on a plurality of images of the calibration plate acquired at predetermined intervals between motion stages.

11. The system of claim 1 wherein the first 2D code comprises a DataMatrix-type code.

12. A calibration plate for calibrating at least one camera comprising:
    a calibration pattern that provides calibration features; and
    a plurality of two-dimensional (2D) codes embedded within respective code-containing regions of the calibration pattern such that the first 2D code replaces a predetermined portion of the calibration pattern, the plurality of 2D codes each being encoded with a respective reference position with respect to one or more of the calibration features that respectively define anchor calibration features; and
    the 2D codes being arranged at a density on the calibration pattern that provides at least one of the 2D codes within a field of view of the camera at a predetermined viewing distance therefrom.

13. The calibration plate of claim 12 wherein the 2D codes each comprise a DataMatrix code.

14. The calibration plate of claim 13 wherein the calibration pattern defines a checkerboard pattern of tiles.

15. The calibration plate of claim 14 wherein the checkerboard pattern of tiles defines tessellating tiles having contrasting visual appearance with respect to each other.

16. The calibration plate of claim 15 wherein the contrasting visual appearance comprises visible light and dark colors.

17. The calibration plate claim 15 wherein the 2D code encodes at least one of (a) a size of the tiles, (b) a number of the tiles in the checkerboard pattern, (c) a size of the 2D code, (d) a number of 2D codes on the calibration plate, and (e) a measurement unit with respect to a numerical value for each reference position.

18. A method for calibrating at least one camera comprising the steps of:
    providing a calibration plate that defines a calibration pattern that provides calibration features and at least a first two-dimensional (2D) code embedded within a first code-containing region of the calibration pattern such that the first 2D code replaces a predetermined portion of the calibration pattern, the first 2D code being encoded with a coordinate value representing a reference position of at least a first anchor calibration feature defined relative to at least one of the calibration features;
    acquiring at least one image of the calibration plate, with a first camera, having a first camera field of view;
    determining, for the first camera, a first coordinate system based upon physical locations of at least some of the calibration features derived from the first anchor calibration feature and respective imaged locations of the calibration features; and
    calibrating the first camera to determine a position and an orientation of the first coordinate system of the first camera relative to a common coordinate system that is based upon either of (a) a predetermined positioning of the calibration plate or (b) characteristics of a motion-rendering device that moves one of either the calibration plate and the first camera during the step of calibrating the first camera.

19. The method of claim 18 further comprising;

providing a second camera, the second camera having second camera field of view of the scene, the second camera field of view imaging at least one of (a) the first 2D code and (b) a second 2D code that is encoded with a coordinate value representing a reference position of at least a second anchor calibration feature defined relative to at least one of the calibration features, acquiring at least one image of the calibration plate, with the second camera;

determining, for the second camera, a second coordinate system based upon physical locations of at least some of the calibration features derived from at least one of (a) the first anchor calibration feature and (b) the second anchor calibration feature, and calibrating the second camera to determine a position and an orientation of the second coordinate system of the second camera relative to the common coordinate system.

* * * * *